May 10, 1966
A. S. McKAY
3,250,986
MAGNETIC RESONANCE METHOD AND APPARATUS
FOR ANALYZING SUBSTANCES
Filed May 1, 1953
4 Sheets-Sheet 1
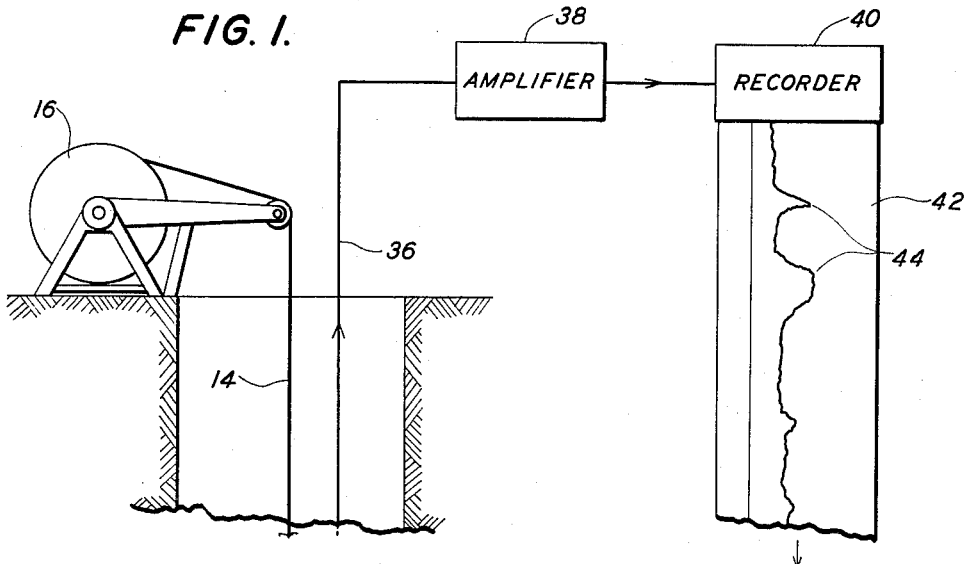
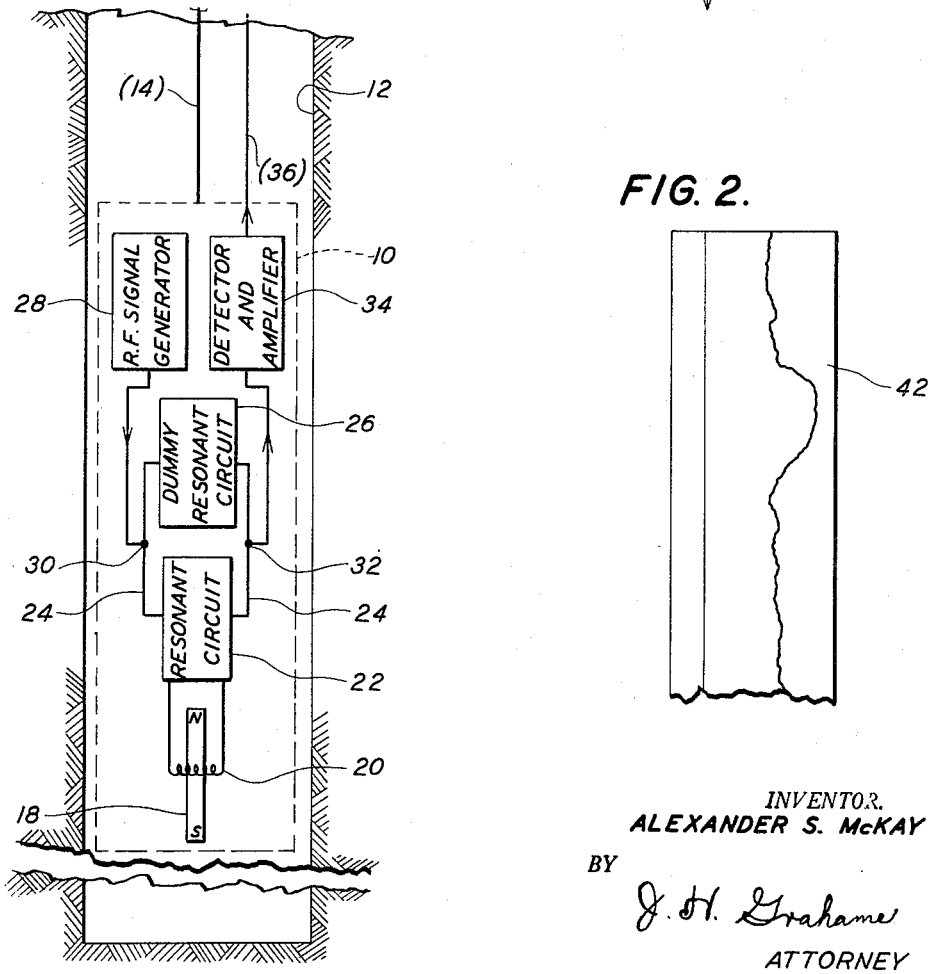
INVENTOR.
ALEXANDER S. McKAY
BY
J. H. Grahame
ATTORNEY

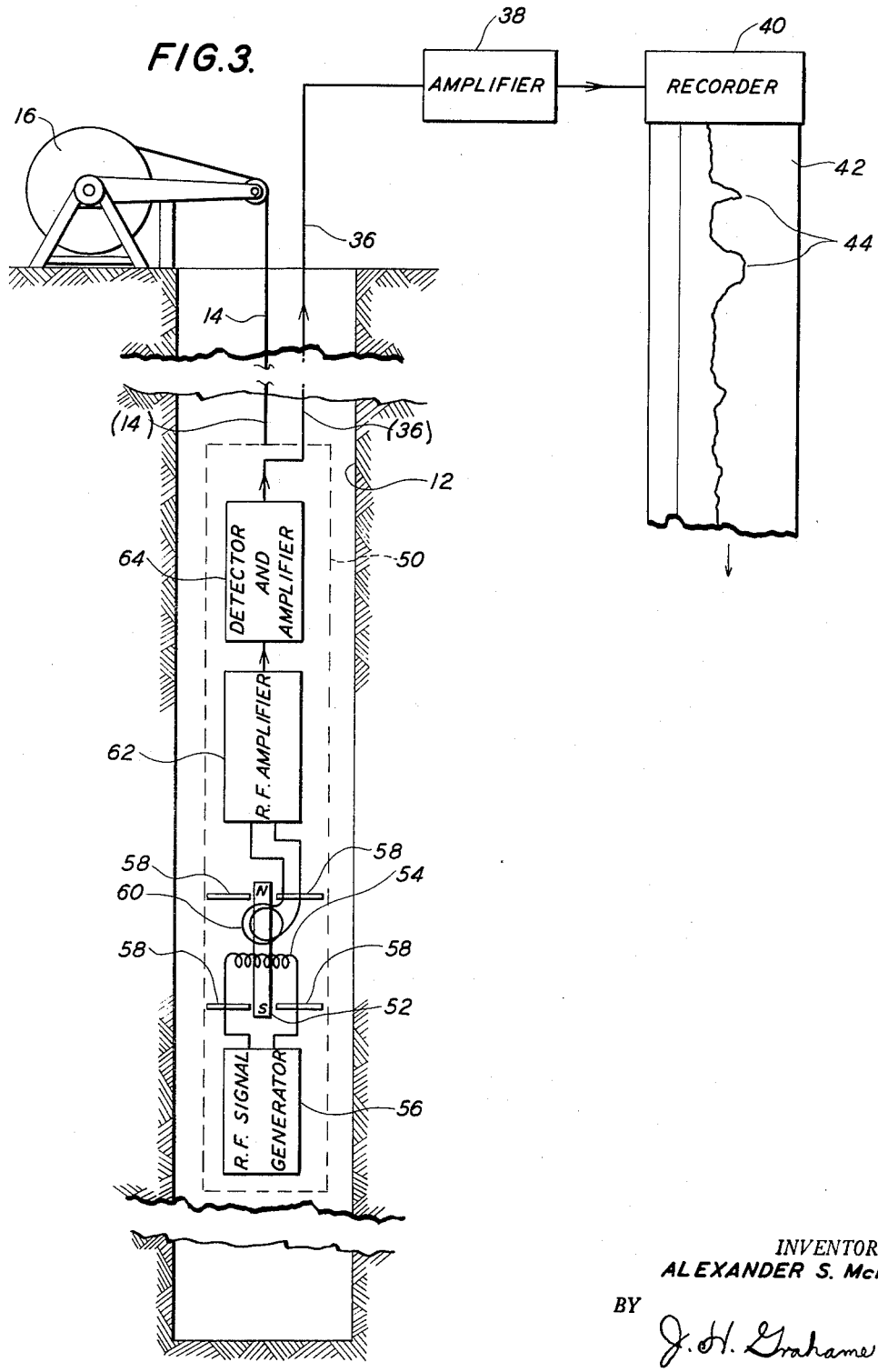

INVENTOR.
ALEXANDER S. McKAY
BY J. H. Grahame
ATTORNEY

May 10, 1966
A. S. McKAY
3,250,986
MAGNETIC RESONANCE METHOD AND APPARATUS
FOR ANALYZING SUBSTANCES
Filed May 1, 1953
4 Sheets-Sheet 4
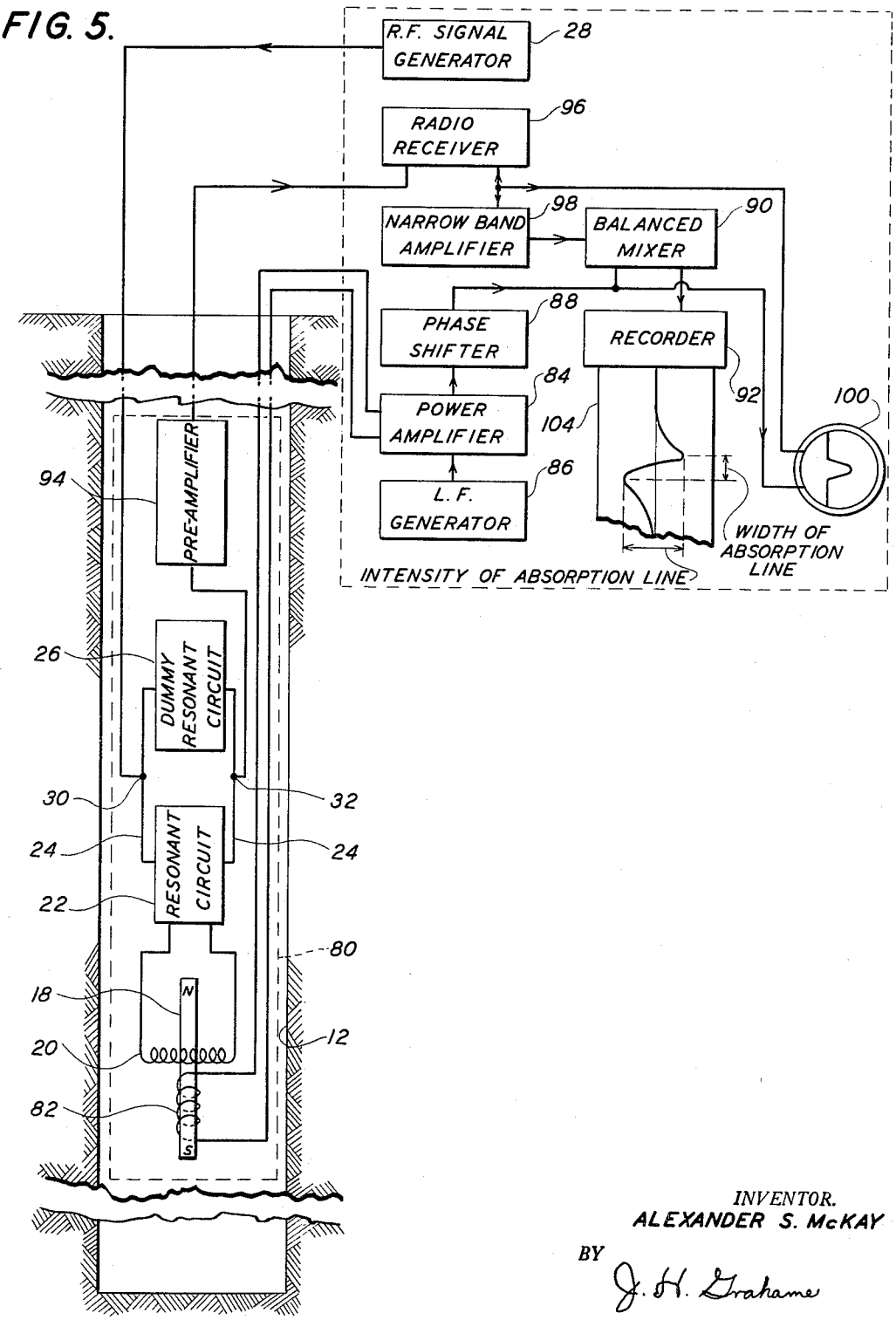
INVENTOR.
ALEXANDER S. McKAY
BY
*J. H. Grahame*
ATTORNEY United States Patent Office 3,250,986
Patented May 10, 1966

3,250,986
MAGNETIC RESONANCE METHOD AND APPARATUS FOR ANALYZING SUBSTANCES
Alexander S. McKay, Bellaire, Tex., assignor to Texaco Inc., a corporation of Delaware
Filed May 1, 1953, Ser. No. 352,559
35 Claims. (Cl. 324—.5)

This invention relates to methods and apparatus for detecting the presence of certain atoms in substances and for ascertaining the environment or chemical state of the atoms.

The present invention is based upon nuclear magnetic resonance effects, and it is particularly suitable for use in logging well bores to locate petroleum deposits.

Conventional arrangements for well logging provide an indication of the resistivity, the response of the formations to radiation from a radioactive source, or the natural radioactivity of the formations. Since such arrangements do not provide a positive indication of the type of substances which are contained in the formations, they are primarily useful in establishing correlations between wells in a given area and they seldom, if ever, give a positive indication of the presence of petroleum deposits.

By employing nuclear resonance techniques in well logging, it is possible to detect petroleum hydrocarbons in the formations surrounding a well, so that even in an unknown and previously unexplored geological section the presence of a potential petroleum producing horizon can be detected.

According to current views, atoms consist of a nucleus containing most of the mass, and planetary electrons. The simplest atom is that of hydrogen 1, and consists of a single proton and a single planetary electron. Hydrogen 2 or deuterium, consists of a single planetary electron and a nucleus, which in turn is decomposable into one proton and one neutron. Hydrogen 3 or tritium consists of one planetary electron and a nucleus decomposable into one proton and two neutrons. All have the same number of protons in the nucleus, or the same atomic number, and are isotopes of each other. In general a neutral atom of any element has a number of planetary electrons equal to the atomic number, and its nucleus contains a number of protons equal to the atomic number and a number of neutrons sufficient to give the nucleus its observed isotopic mass. To illustrate, carbon 12 has atomic number 6 and atomic weight 12. It consists of 6 planetary electrons and a nucleus of 6 protons and 6 neutrons.

Neutrons, protons and electrons all possess an intrinsic spin angular momentum and an associated magnetic moment. In addition, protons and electrons give rise to magnetic fields by virtue of the motion of their charges. The gross magnetic properties of materials are attributed primarily to ordering of electronic magnetic moments.

The spin and orbital angular moments of the separate protons and neutrons in a nucleus combine to give a resultant angular momentum generally called the nuclear spin. Associated with this spin is a magnetic moment whose value depends on the particular way in which the separate spins are combined. A simple rule that seems to hold is that when an even number of both protons and neutrons is present in the nucleus, their respective angular momenta add to give zero and hence have no associated magnetic moment. Carbon 12, for example, has an even number of both protons and neutrons, and hence no magnetic moment; whereas hydrogen 1 with a single proton, hydrogen 2 with a proton and a neutron, and hydrogen 3 with a proton and two neutrons all have nuclear magnetic moments.

A compass needle exhibits the property of a permanent magnetic moment. Placed in a magnetic field, its energy depends on its orientation with respect to this field, and its stable position of minimum energy exists when it is lined up with the field. By the expenditure of energy it can be caused to assume other orientations. However, the nuclear magnetic moment, by virtue of "space-quantization" can only assume a limited number of distinguishable orientations, and correspondingly can only absorb or emit energy in amounts corresponding to changes between allowed orientations. The number of orientations is given by $(2I+1)$, where I is the quantum number of nuclear angular momentum. Thus a proton, since it has $I=\frac{1}{2}$, has two orientations, roughly parallel and anti-parallel to the field direction. The angular momentum, to which the magnetic moment is coupled, precesses around the field directions at a rate proportional to the magnetic field strength, in such a way that its component along the field direction is constant.

If in addition to a steady magnetic field, varying fields with frequency components in the neighborhood of the Larmor precession frequency are present, the nuclear magnetic moment may be caused to change its orientation by a resonance effect. If the frequency of a properly oriented applied oscillating magnetic field matches that corresponding to the difference in energy between adjacent orientations according to the rule, Planck's constant times the frequency equals the energy jump, then the transistion will occur. If the match is not close, transitions will be very unlikely.

For example, when a magnetic field of strength 1826 gauss is applied to a sample of water, the protons which form the hydrogen 1 nuclei have only two possible orientations with respect to the field. The "parallel" orientation has the least energy. At this field strength it requires about $5 \times 10^{-20}$ ergs to excite the "anti-parallel" orientation. This corresponds to a frequency of 7.76 megacycles per second. The resonance frequency can be computed in general from the following formula:

Resonance frequency =
$$\frac{\text{Steady magnetic field strength}}{\text{Planck's constant}} \times \frac{\text{Nuclear magnetic moment}}{\text{Nuclear angular momentum}}$$

For protons this gives $4250 \times$ magnetic field strength in gauss, or to take the example above $4250 \times 1826 = 7.76$ megacycles per second. Since the magnetic field at each proton is not exactly the same, the resonance will occur in a narrow band of frequencies centered on 7.76 megacycles. The resonance line width, which is the measure of this band width, depends on the inhomogeneities in the applied field, as well as those arising from the internal structure of the material.

Except when they are under the influence of a magnetic field the magnetic moments of the protons of hydrogen are in random orientation—for before the field is applied, the parallel and anti-parallel positions of the nuclei are no different in energy and equally likely to occur. Upon application of the field, the protons snap into line with substantially half parallel and the remainder anti-parallel, but this is not a stable condition in the field, because with the field applied, the anti-parallel state of the proton has a higher energy, and hence tends to emit this energy difference and drop to the lower parallel state. This tendency is counteracted by thermal motion, which gives rise to field components at the resonant frequency, and hence to transitions up and down between the two states. As a result, an equilibrium is established at any given temperature, where there is a slight excess occupation of parallel states compared with anti-parallel states. This equilibrium condition is not, however, attained the instant the magnetic field is applied, but rather is approached according to a characteristic time known as the relaxation time. The relaxation time is ordinarily defined as the time required for damping forces to act and suppress nuclear precession so that the nuclear moments will line up with the magnetic field.

In copending application Serial No. 238,754, now abandoned, which was filed by Gerhard Herzog on July 26, 1951, methods and apparatus are disclosed for employing nuclear resonance techniques in well logging. The methods and apparatus disclosed in the Herzog application are based upon providing a measure of the resonant frequencies, the resonant line width, or the relaxation times of nuclei of atoms encountered in the substances of formations surrounding a well bore.

I have discovered that petroleum deposits can be detected by providing logging apparatus which detects the occurrence of only one type of atom in the formations surrounding the well bore and which is arranged to provide an indication of the environment or chemical state of the atoms. Hydrogen atoms are contained in all petroleum deposits and these atoms appear to provide stronger responses when nuclear resonance techniques are employed than any other type of atoms which normally occur in petroleum deposits. Hence I prefer to detect the occurrence of hydrogen atoms in order to locate petroleum bearing formations along a well bore.

It is desirable to distinguish between hydrogen atoms in hydrocarbons and hydrogen atoms in other environments or chemical states because most of the formations contain some hydrogen atoms. Most of the formations contain water, either natural water or that due to penetration of water from the drilling fluid, and the hydrogen atoms in water should be distinguished from the hydrogen atoms in hydrocarbons in order to provide a reliable indication of petroleum deposits and in order to provide an indication of the oil-water ratio of petroleum bearing formations.

In accordance with my invention, hydrogen atoms in hydrocarbons are detected and distinguished from hydrogen atoms in water by producing magnetic fields proportioned and oriented to cause hydrogen nuclei to attain a resonant condition, and by exposing the substances to be analyzed, say well formations, to the unidirectional magnetic field for a sufficient interval of time to cause the hydrogen nuclei having relatively short relaxation times to resonate but for a sufficiently short interval of time that the hydrogen nuclei having relatively long relaxation times do not respond appreciably.

Nuclear resonance phenomena can be detected only after the nuclei have been exposed to a unidirectional magnetic field for a sufficient interval of time that the number of protons which are in the parallel or lower energy state exceeds the number of protons in the anti-parallel or higher energy state. Thus, by controlling the time intervals during which the nuclei are exposed to a unidirectional magnetic field, it is possible to limit the response of well logging apparatus to nuclei having predetermined relatively short relaxation times as contrasted with other nuclei having longer relaxation times.

Some nuclear resonance phenomenon occurs at the instant when the nuclei are exposed to the unidirectional magnetic field and to a radio frequency signal which is tuned to the precession frequency of the nuclei. However, a substantial nuclear resonance signal will occur only after the unidirectional magnetic field has been applied to the nuclei for a period of time on the order of the thermal relaxation time of the nuclei in question, since it takes a time interval of about this magnitude before the essential magnetic polarization of the nuclear spins can be accomplished in any significant degree.

Nuclei of hydrogen atoms in typical crude oil at room temperature have a relaxation time of about 0.1 second, whereas nuclei of hydrogen atoms in pure water at room temperature have a relaxation time of about 2 seconds. Hence hydrogen atoms in hydrocarbons can be distinguished from hydrogen atoms in water by controlling the time intervals during which the nuclei of hydrogen atoms are exposed to magnetic fields which are proportioned to cause the nuclei to resonate.

The time during which the substance to be analyzed is exposed to magnetic fields proportioned to cause selected nuclei to attain a resonant condition—and hence, the type and magnitude of nuclear magnetic resonance signal to be expected as a consequence—may be controlled (a) by moving the source of the magnetic fields with respect to the substance to be analyzed, (b) by moving the substance past the source of the magnetic fields, (c) by turning the unidirectional magnetic field on for predetermined brief periods of time, (d) by modulating the unidirectional magnetic field at suitable frequencies and through suitable amplitudes, (e) by pulsing the oscillating transverse magnetic field using a pulse pattern of appropriate duration, and repetition rate, or (f) by frequency modulating the oscillating transverse magnetic field through suitable frequency ranges (band widths) and at favorable modulation frequencies.

In well logging, to distinguish between water and hydrocarbons on the basis of their different proton thermal relaxation time, I prefer to control the time intervals during which the formations are exposed to magnetic fields for producing nuclear resonance by controlling the speed at which the logging head is moved up or down the well bore, or by modulating the unidirectional field strength at certain frequencies and through certain amplitudes. In Case (a) that of moving the logging head in the well bore, the rate of motion is kept such that only the substance in the formation having the shorter relaxation time is capable of appreciable magnetic polarization in the interval of measurement. In the most favorable instance the contribution of the more readily relaxed substance to the total nuclear resonance signal will be greater than that of the other constituent just in the ratio of the two relaxation times. In Case (d), that of magnetic field modulation, the situation is more complex in general, though if modulation periods extremely short in comparison with the two relaxation times are considered, the signals due to oil and water can be computed with fair accuracy from theory, and hence oil and water can be distinguished on the basis of their different degrees of saturation under otherwise identical conditions.

A log indicating the hydrogen atoms of hydrocarbons detected in the formations is all that is required in many cases, but it is desirable to provide a log of the total hydrogen content of the formations also, so as to provide more complete information as to the substances encountered in the formations.

A nuclear resonance log or a radiation log, such as a neutron-gamma or a neutron-neutron log, may be obtained to provide a measure of the total hydrogen content or porosity of the formations. By comparing a log of the hydrogen content of hydrocarbons in the formations and a log of the total hydrogen content of the formations, the oil-water ratio in the formations can be ascertained.

Although the methods and apparatus of my invention are particularly suitable for distinguishing between hydrogen atoms in hydrocarbons and hydrogen atoms in water, it will be apparent that the invention may be employed to distinguish between other types of atoms provided some of the atoms have a relaxation time which is relatively short with respect to the relaxation time of the other atoms.

The invention is explained with reference to the drawings, in which:

FIG. 1 shows one form of logging apparatus based upon nuclear absorption which is suitable for carrying out the methods of my invention, and it also illustrates the type of record obtainable when the logging head is moved at a speed which is high enough to prevent response of hydrogen atoms in water, but low enough to permit hydrogen atoms in hydrocarbons to respond;

FIG. 2 illustrates the type of record obtainable by the apparatus of FIG. 1 when the logging apparatus is moved at a speed which is slow enough to permit hydrogen atoms of water in the formations adjacent the well to respond;

FIG. 3 shows another suitable logging apparatus which is based upon nuclear induction;

FIG. 5 shows still another form of suitable logging apparatus wherein one of the magnetic fields is modulated at a frequency which may be controlled so as to cause selected atoms to respond.

Figures 4, 6:
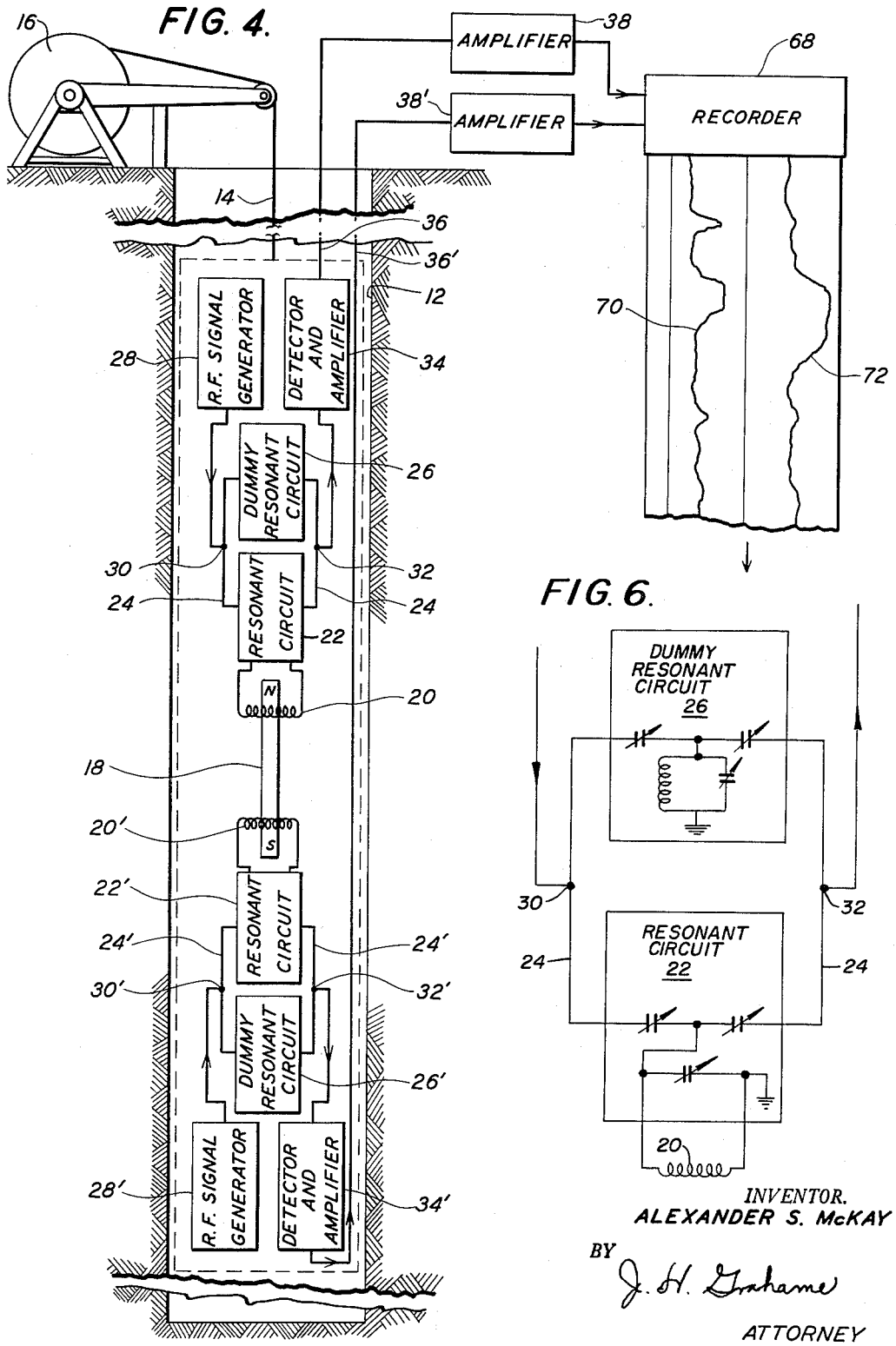
FIG. 4 shows a modification of the apparatus of FIG. 1 arranged to detect simultaneously the total hydrogen content and the hydrogen of hydrocarbons in the formations adjacent the well bore.
FIG. 6 shows a resonant circuit arrangement which may be employed in the apparatus of FIGS. 1, 4 and 5.

The apparatus of FIG. 1 comprises a logging head 10 which may be moved up and down a well bore 12 at controlled speeds by a cable 14 and a suitable reel such as a winch 16.

The logging head contains a permanent bar magnet 18 that has sufficiently great magnetic moment that its lines of force penetrate the formations in which the well is bored. Within the field of the magnet and disposed perpendicular to the major axis of the magnet is a detector coil 20 which is part of a resonant circuit 22. This resonant circuit is connected in a radio frequency bridge 24 with a dummy resonant circuit 26 which has the same characteristics as the first resonant circuit when the latter is not undergoing nuclear resonance. FIG. 6 shows one type resonant circuit arrangement which may be employed. A radio frequency signal generator 28 is connected to one side of the bridge between the resonant circuits at a point 30. A mixing point 32 at the other side of the bridge is connected to a detector and an amplifier 34. The section of the bridge between the point 32 and the resonant circuit 22 is selected to introduce a half wave shift by conventional means. By way of example, this may be achieved by making the electrical length of the connection between the point 32 and the resonant circuit 22 one-half wave length longer than the electrical length of the connection between the point 32 and the dummy resonant circuit 26. In the alternative, the electrical length of the connection between the point 30 and the resonant circuit 22 may be one-half wave length longer than the electrical length of the connection between point 30 and the dummy resonant circuit 26. Consequently the signal arriving normally in the mixing point 32 under non-resonant conditions is practically zero.

The detector may be a conventional type such as a thermionic or crystal diode. For example, the detector may be a conventional type employing a 6H6 tube or employing a IN34A crystal. Preferably the detector is preceded by a radio frequency amplifier in accordance with conventional practice.

The detector serves to detect or rectify the radio frequency signal which appears at the point 32 of the bridge circuit. The radio frequency signal may be amplitude-modulated by nuclear magnetic resonance effects, and the detector provides an output signal representative of the amplitude modulation.

The output of the detector and amplifier 34 is fed through a lead 36 to an amplifier 38 which in turn feeds a recorder 40. By way of example, the recorder 40 may be a pen-type recorder which serves to produce a permanent record 42 of the nuclear resonance phenomena sensed by the logging head as it is moved along the well bore.

A nucleus, say a nucleus of hydrogen contained in the formations adjacent the logging head, under the influence of the field produced by the permanent magnet 18 will precess about the direction of the lines of force in the magnetic field with a frequency $$f = \frac{\text{magnetic field strength}}{\text{Planck's Constant}} \times \frac{\text{magnetic moment of the nucleus}}{\text{angular momentum}}$$

Where $f$ is the nuclear magnetic resonance frequency in cycles per second, the magnetic field strength is in oersteds, Planck's constant is $6.624 \times 10^{-27}$ erg seconds, the magnetic moment of the nucleus is in ergs per oersted, and the angular momentum of the nucleus is in units of $1/2\pi$ times Planck's constant (which is a dimensionless number). The values for the magnetic moment of the nucleus and for the angular momentum are available in various text-books and technical journals; one such text-book is "Nuclear Physics Tables" by J. Mattauch, which was published in 1946 by Interscience Publishers.

The term "unidirectional magnetic field" is used to describe magnetic lines of force produced by a permanent magnet or by an electromagnet energized by direct current. When nuclei are exposed to the unidirectional field, the protons line up with the magnetic field with substantially half the protons in a parallel orientation and the remainder in the anti-parallel orientation. As discussed above, this is not a stable condition in the field because the anti-parallel state of the protons has a higher energy and hence tends to emit this energy difference and drop to the lower parallel state. This tendency is counteracted by thermal motion, which gives rise to field components at the resonant frequency, and hence to transitions up and down between two states. As a result, an equilibrium is established at any given temperature where there is a slight excess of occupation of parallel states compared with anti-parallel states. This equilibrium condition is not attained the instant the nuclei are exposed to the magnetic field, but rather it is controlled by the time required for damping forces to act and suppress the nuclear precession, i.e., by the relaxation time.

If the nuclei are exposed to the unidirectional magnetic field of the magnet 18 for an interval of time which is approximately equal to or which is greater than the relaxation time of the nuclei, the number of protons in the parallel or lower energy state will be slightly greater than the number of protons in the anti-parallel or higher energy state and the nuclei will resonate when the alternating magnetic field provided by the coil 20 is of the proper frequency. Hence nuclear resonance phenomena may be detected.

However, if the protons are exposed to the unidirectional magnetic field for a time which is appreciably less than their relaxation time, little or no nuclear resonance phenomena can be detected.

In the arrangement of FIG. 1, the time during which the nuclei in the formations adjacent the logging head are exposed to the magnetic fields is controlled by controlling the speed of movement of the logging head.

By way of example, the speed of movement of the magnet 18 might be 30 feet per minute for a magnet having a length of five feet and producing a magnetic field strength of 40 oersteds in the region of the formation under observation.

If the radio frequency signal generator 28 is adjusted so that its output signal has a frequency corresponding to the proton nuclear resonance frequency of the nuclei in the adjacent formation, and the nuclei are exposed to the unidirectional field of the magnet 18 for a sufficient interval of time to cause an excess number of protons to be aligned in the parallel or lower energy state, the nuclei will absorb energy from the coil 20. The amount of absorption of energy from the coil 20 is indicated by the amount of unbalance that results at the mixing point 32. Thus, the magnitude of the signal which is applied to the detector and amplifier 34 is a measure of the amount of absorption of energy and hence the magnitude of the nuclear resonance phenomena which results.

The coil 20 should be flat and of the largest diameter possible in order to obtain the best sensitivity. In order to increase the resolving power of the logging head, it is desirable to shape the radio frequency magnetic field provided by the coil 20 so that the useful portion of the field is confined to a narrow region disposed at right angles to the magnet 18. The radio frequency magnetic field may be shaped to some extent by employing conductive shields as illustrated in FIG. 3.

When the logging head of FIG. 1 is moved up or down the well 12 at a speed which is sufficiently fast that the nuclei of hydrogen atoms of water which are exposed to the magnetic field do not have time to come to equilibrium but at a speed sufficiently slow that the nuclei of hydrogen atoms of hydrocarbons do have time to come to equilibrium, a record of the type illustrated in FIG. 1 may be obtained. The pronounced irregularities 44 indicate that nuclei of hydrogen in hydrocarbons have been detected.

If the logging head of FIG. 1 is moved at a rate which is sufficiently slow that nuclei of hydrogen atoms in water will respond, a log of the type illustrated in FIG. 2 is obtained representing the total hydrogen content of the formations surrounding the well.

By comparing the information on the log of FIG. 1 with that shown on the log of FIG. 2, it is possible to make a comparison of the occurrence of hydrocarbon deposits and water deposits in the formations. Thus, the oil-water ratio in petroleum bearing formations may be ascertained.

Instead of moving the logging head at a slow speed in order to measure the total hydrogen content of the formations, such measurement can be made by conventional radiation methods such as the neutron-gamma or the neutron-neutron method of logging.

In the apparatus of FIG. 1, nuclear absorption is the basis for measuring the nuclear resonance phenomena. The condition of nuclear resonance may also be indicated by measuring the phase shift of the signal in the energizing coil 20 (nuclear dispersion), or by an induced signal in an entirely separate coil (nuclear induction).

The apparatus of FIG. 3 is of the nuclear induction type. It comprises a logging head 59 adapted to be moved up or down the well bore by a cable 14, as before. The logging head contains a permanent bar magnet 52 that has sufficiently great magnetic moment that its lines of force penetrate the formations surrounding the bore. A radio frequency energizing coil 54 is disposed in the logging head in the field of the magnet and perpendicular to its major axis. The coil 54 is energized by a radio frequency signal generator 56 which is tuned to the resonance frequency for the nuclei to be detected.

If desired, conductive shields 58 disposed in planes perpendicular to the axis of the well bore and located immediately above and below the coil 54 may be employed to shape the radio frequency magnetic field in the vertical direction so as to increase the resolving power of the logging head.

Thus the unidirectional magnetic field provided by the magnet 52 causes the nuclei to align themselves with the magnetic field if the nuclei are exposed for an interval of time which is approximately equal to or which is greater than the relaxation time of the nuclei. The radio frequency energy which is applied to the coil 54 causes the nuclei to precess about the lines of magnetic force provided by the magnet 52, and the magnitude of the nuclear resonance phenomena can be detected by a pick-up coil 60 which is disposed perpendicular to the axes of the energizing coil 54 and the magnet 52.

The output of the pick-up coil 60 is applied to a radio frequency amplifier 62 which in turn is connected to a detector and amplifier 64. The output of the logging head is applied through a lead 36 to an amplifier 38 and a recorder 40 where a record 42 is produced.

The apparatus of FIG. 3 provides the same type records as the apparatus of FIG. 1 and it may be used in the same manner as described above with respect to FIG. 1.

In the apparatus of FIG. 1, if the detector coil 20 is located at the upper or at the lower extremity of the useful portion of the unidirectional magnetic field, the logging tool can be moved at a speed so that it is sensitive to hydrogen nuclei in hydrocarbons or to hydrogen nuclei in hydrocarbons and in water, depending upon the direction of movement of the logging head. For example, if the detector coil 20 is located at the top of the useful portion of the unidirectional magnetic field, then as the logging head is lowered in a well bore the portions of the formations which are examined by the detector coil 20 are exposed to the unidirectional magnetic field for a time interval which is sufficiently long that the nuclei in water as well as the nuclei in hydrocarbons contribute to the signal. However, when the logging head is drawn up the well bore, the portions of the formations which are examined by the detector coil 20 are not subjected to the unidirectional magnetic field long enough for the nuclei in water to contribute to the signal, but they are subjected to the unidirectional magnetic field long enough for the nuclei in hydrocarbons to respond. Hence, only the nuclei in hydrocarbons are detected as the logging head is drawn up the well bore. Such an arrangement is illustrated by the upper coil 20 and associated circuitry of the apparatus shown in FIG. 4.

This aspect of the invention can be extended by employing two independent detection arrangements as shown in FIG. 4. The two detection arrangements are designated by numbers corresponding to those of FIG. 1, with the second detection arrangement being designated by the numbers primed.

The respective detector coils 20, 20' are located at the ends of the useful portion of the unidirectional magnetic field provided by the magnet 18. Preferably the major axes of the coils 20, 20' are disposed at right angles to one another in order to reduce the coupling between the coils.

The relationship between the relaxation times of hydrogen atoms of hydrocarbons and of hydrogen atoms of water is dependent to some extent upon the physical and chemical environments of the atoms in the formations. Assuming that the environments are such that the relaxation time of hydrogen atoms in hydrocarbons is appreciably less than that of hydrogen atoms in water, which is the usual situation, the logging head of FIG. 4 can be moved at a suitable speed so that one of the coils 20, 20' detects the response of hydrogen atoms of hydrocarbons and the other coil detects the response of hydrogen atoms of both hydrocarbons and water. By way of example, if the logging head is moved up the well at a suitable speed, the coil 20 would detect the response of hydrogen atoms of hydrocarbons while the coil 20' would detect the response of hydrogen atoms of both hydrocarbons and water. If the logging head is lowered in the well at a suitable speed, the coil 20 would detect the response of hydrogen atoms of both hydrocarbons and water while the coil 20' would detect the response of hydrogen atoms of hydrocarbons.

Preferably the recorder 68 employed in this embodiment of the invention is a dual type arranged to provide a trace 70 representing hydrocarbon nuclear resonance phenomena and a trace 72 representing the total hydrogen resonance phenomena. The two traces 70, 72 correspond to the records shown in FIGS. 1 and 2 and may be used in the same manner.

The logging apparatus can be controlled so as to respond to nuclei of hydrogen atoms in hydrocarbons by turning the unidirectional magnetic field on for a period of time which will cause hydrogen atoms in hydrocarbons to respond, but which will not cause hydrogen atoms in water to respond. Since it is rather difficult to turn a magnetic field on for such a brief interval of time, it is preferable to modulate or vary the unidirectional magnetic field at a rate which is sufficiently low that the hydrogen nuclei in hydrocarbons respond, but which is sufficiently high that hydrogen nuclei in water do not respond.

FIG. 5 shows the apparatus of FIG. 1 modified so as to provide a modulated unidirectional magnetic field so that selected nuclei can be detected.

The logging apparatus of FIG. 5 is similar to that of FIG. 1 except that the unidirectional magnetic field is modulated and different instrumentation is employed.

The logging head 80 contains a bar magnet 18, a pick-up coil 20 and an associated bridge arrangement of the same type as shown in FIG. 1. In addition, a low frequency modulating coil 82 is provided on the magnet 18. It is connected through the logging cable to a power amplifier 84 that receives current at a low frequency from a low frequency generator 86. The power amplifier 84 also feeds a conventional phase shifter 88 which in turn feeds a balanced mixer 90. The output of the balanced mixer is fed to a recorder 92, which may be a pen-type as before.

The signal at the mixing point 32 in the logging head is applied to a pre-amplifier 94, and the output of the pre-amplifier is fed through the logging cable to a receiver 96. The output of the receiver is applied to a narrow band amplifier 88 which is tuned to the same frequency as that of the generator 86. The output of the narrow band amplifier is applied to the balanced mixer where it is compared with the signal which is applied to the balanced mixer through the phase shifter 88.

If desired, an additional indication of the nuclear resonance phenomena may be obtained with a conventional cathode-ray oscilloscope 100 having its horizontal plates coupled to the output of the phase shifter 88, and having its vertical plates coupled to the output of the receiver 96.

With the frequency of the signal applied to the detector coil 20 tuned to the resonance frequency for nuclei of hydrogen atoms, the logging apparatus of FIG. 5 will respond only to nuclei of hydrogen atoms in hydrocarbons if the frequency of the generator 86 is properly adjusted. If the frequency of the generator 86 is lowered, the logging apparatus will detect nuclei of hydrogen atoms in both hydrocarbons and water.

The low frequency modulation of the unidirectional magnetic field causes the unidirectional magnetic field to be correctly proportioned periodically so as to cause the nuclei to resonate and produce a signal of the same frequency as the modulation frequency. If hydrogen nuclei in hydrocarbons are being detected, then for example, a five-cycle small field modulation of the unidirectional magnetic field produces a five-cycle signal at the output of the receiver 96. If a narrow sloping portion of the peak is scanned, the receiver output is a five-cycle wave, the amplitude of which is the measure of the slope of the portion of the peak in the scanning range. The five-cycle wave is amplified in the amplifier 98, and the output of this amplifier is a sinusoidal wave whose amplitude is a measure of the slope of the absorption curve or peak. This sinusoidal signal and the five-cycle signal from the low frequency generator 86 are mixed in the balanced mixer 90 to provide an output which is proportional to the slope of the absorption curve. As the unidirectional magnetic field is varied through the resonance value by varying the current in the coil 82 wound around the magnet 18, a curve of the type shown on the record 104 is traced by the recorder 92.

If the entire absorption curve is scanned, the curve traced by the recorder is the derivative of the absorption curve which is shown directly on the screen of the cathode-ray oscilloscope 100. Such a curve is illustrated on the record 104.

From the curve traced on the record 104, the height of the absorption peak or the intensity of the absorption line is measured by the sum of the minimum and maximum distances from the base line along the horizontal axis of the record. The apparent line width is indicated by the vertical distance from the maximum to the minimum of the curve.

The presence of paramagnetic material in the formations tends to decrease the relaxation time of the nuclei by increasing the coupling of the lattice to the nuclear moment, say to that of protons in hydrocarbons. In consequence, the difference in observed relaxation time for water and hydrocarbon proton magnetic moments will become smaller, and it will become more difficult to get an indication of the presence of hydrocarbons in the formations as the concentration of magnetic materials in or adjacent the bore increases. Free oxygen is paramagnetic as are iron, cobalt, nickel, chromium, copper, manganese and their ions, iron ammonium alum, and potassium ferricyanide.

The apparatus of FIGS. 1, 3 and 4 is primarily useful for logging extensive portions of, or the entire length of a well bore since the response of the logging head is dependent upon the speed at which it is moved. The apparatus of FIG. 5 may be employed to log extensive portions of a well bore or localized regions since the response of the logging head is not dependent upon the speed at which it is moved.

An effective way of using the apparatus of FIG. 5 is to first run a neutron log to determine the locations of deposits of hydrogen represented by water or oil in the formations, and then ascertain which of the two substances is actually present by measuring the nuclear magnetic moments at the locations in question. Thus, a neutron log is first run, and then a nuclear resonance log is run. The nuclear resonance log may be obtained only in the regions in which large hydrogen concentrations are indicated on the neutron log so as to ascertain whether the hydrogen is contained in water or in petroleum deposits.

In the alternative, the nuclear resonance log may be coextensive with the neutron log so as to distinguish between hydrogen in water and hydrogen in petroleum throughout the portion of the well bore which is logged. In this case, any of the embodiments of the invention illustrated in the drawings may be employed. As discussed above with reference to FIGS. 1 and 4, a nuclear resonance log which indicates the presence of hydrogen in both water and petroleum may be employed instead of a neutron log, if desired.

Although the methods and apparatus of my invention have been described with particular reference to well logging apparatus, it will be apparent that they are equally applicable to analyzing substances other than those located in well bores. For example, the methods of my invention may be employed in the laboratory analysis of substances in situations wherein it is desirable to differentiate between nuclei having different relaxation times.

I claim:

1. In well logging, the improvement which comprises producing unidirectional and alternating magnetic fields proportioned and oriented with respect to one another to cause nuclei of a certain type to resonate, exposing portions of the formations surrounding a well to be logged to said magnetic fields for a predetermined interval of time to cause said nuclei to attain a resonant condition, said interval of time being less than a predetermined longer duration of time sufficient to cause certain other non-selected nuclei having longer relaxation times to attain a resonant condition, and detecting the response of the nuclei to said magnetic fields in order to provide an indication of the presence of said certain nuclei in the portions of the formations exposed to said fields.

2. In well logging, wherein a well logging head is passed through a bore hole, the improvement which comprises producing adjacent a well logging head a uni-directional magnetic field and an alternating magnetic field proportioned and oriented with respect to one another to cause nuclei of a certain type to attain a resonant condition, moving the well logging head along a well bore at a speed which exposes portions of the surrounding formations to the magnetic fields for a predetermined interval of time sufficient to cause said nuclei to resonate but for an interval of time which is less than a predetermined longer interval required to cause other nuclei having longer relaxation times to resonate, and detecting the response of the nuclei to said magnetic fields in order to provide an indication of the presence of nuclei of said certain type in said formation.

3. In well logging, wherein a well logging head is passed through a bore hole, the improvement which comprises producing adjacent a well logging head a uni-directional magnetic field and an alternating magnetic field proportioned and oriented with respect to one another to cause nuclei of a certain type to attain a resonant condition, moving the well logging head along a well bore, modulating the unidirectional magnetic field at a frequency which exposes portions of the surrounding formations to said proportioned magnetic fields for predetermined intervals of time of sufficient duration to cause said nuclei to resonate but for intervals of time which are less than than required to cause other nuclei having longer relaxation times to resonate, and detecting the response of the nuclei to said magnetic fields in order to provide an indication of the condition of the formations.

4. In well logging wherein a well-logging head is passed through a bore hole, the improvement which comprises producing unidirectional and alternating magnetic fields adjacent a well logging head proportioned and oriented with respect to one another to cause nuclei of hydrogen atoms to resonate, exposing portions of the formations surrounding a well bore to be logged to said magnetic fields for an interval of time which is of the the relaxation time of hydrogen nuclei in hydrocarbons but which is less than the relaxation time of hydrogen nuclei in water, and detecting the response of the nuclei to said magnetic fields and providing an indication thereof.

5. The method of claim 4 wherein the interval of time during which portions of the formations are exposed to the magnetic fields is controlled by moving the logging head at a predetermined speed.

6. The method of claim 4 wherein the interval of time during which portions of the formations are exposed to said proportioned magnetic fields is controlled by modulating one of the magnetic fields at a predetermined frequency.

7. In well logging wherein a well-logging head is passed through a bore hole, the improvement which comprises producing unidirectional and alternating magnetic fields proportioned and oriented with respect to one another to cause nuclei of hydrogen atoms to resonate, exposing portions of the formations surrounding the well bore to be logged to said magnetic fields for an interval of time which is of the order of the relaxation time of the hydrogen nuclei in hydrocarbons but less than the relaxation time of the hydrogen nuclei in water, providing an indication of the response of the nuclei to said magnetic fields so as to provide a measure of the response of nuclei of hydrogen in hydrocarbons located in the well formations, and providing an indication of the total hydrogen content of the formations along the well bore, so that the total hydrogen content of the formations can be compared with the content of hydrogen in hydrocarbons in the formations.

8. In well logging, wherein a well logging head is passed through a bore hole, the improvement which comprises producing adjacent a well logging head in the vicinity of an earth formation a uni-directional magnetic field and an alternating magnetic field having a component of its vector transverse to that of the uni-directional magnetic field, the strength of the uni-directional magnetic field and the frequency of the alternating magnetic field being proportioned with respect to one another to cause nuclei of hydrogen atoms to resonate, exposing portions of the formations surrounding a well bore to be logged to said magnetic fields for an interval of time which is of the order of the relaxation time of hydrogen nuclei in hydrocarbons but which is less than the relaxation time of hydrogen nuclei in water, and providing an indication of the response of the nuclei to said magnetic fields.

9. The method of claim 8 further including the steps of exposing said portions of the formations to said magnetic fields for an interval of time which is approximately as long as the relaxation time of hydrogen nuclei in water, and providing an additional indication of the response of the nuclei to the magnetic fields, so that potential petroleum bearing formations can be located by comparing the two indications of the response of the nuclei to the magnetic fields.

10. The method of analyzing a sample for determining the presence of certain pre-selected nuclei therein having a predetermined relatively short relaxation time and being adapted and arranged to attain a significant state of equilibrium in response to the application of a given uni-directional magnetic field for a time interval of predetermined relatively short duration, as compared with other non-selected nuclei therein having a comparatively long relaxation time and being adapted and arranged to attain a significant state of equilibrium in response to the application of said given uni-directional magnetic field for a significantly longer time interval of predetermined longer duration, comprising the steps of applying a uni-directional first magnetic field to the sample for a time interval of at least said predetermined short duration and less than said predetermined longer duration, whereby substantially only said pre-selected nuclei are caused to attain a significant state of equilibrium; and, near the end of said time interval, applying to said sample a second magnetic field having a vector component that is perpendicular to the first field and which periodically changes in direction at a frequency near the precession rate of said pre-selected nuclei for causing any of said nuclei that are in a significant state of equilibrium to resonate, and detecting the state of resonance of said sample, whereby the presence of any of said pre-selected nuclei may be determined.

11. The method of analyzing a substance for determining the presence of certain pre-selected nuclei therein having a predetemined relatively short relaxation time and requiring the application of a given uni-directional magnetic field for a time interval of predetermined relatively short duration to establish a greater number of its protons in the lower energy state than in the higher energy state, as compared with other non-selected nuclei therein having a comparatively long relaxation time and requiring the application of said given uni-directional magnetic field for a significantly longer time interval of predetermined longer duration to establish a greater number of its protons in the lower energy state than in the higher energy state, comprising the steps of applying a uni-directional magnetic field to the substance for a time interval of at least said predetermined short duration and less than said predetermined longer duration, whereby a greater number of the protons of said pre-selected nuclei only are established in the lower energy state than in the higher energy state, applying to said substance an alternating magnetic field having a vector component that is perpendicular to the first field, the frequency of the alternating magnetic field and the strength of the uni-directional field being proportioned to cause the protons in the lower energy state to resonate, and detecting the state of resonance of said substance, whereby the presence of any of said pre-selected nuclei may be determined.

12. The method of claim 11 wherein the time interval during which the uni-directional magnetic field is applied to the substance is controlled by changing the spacing between the substance under analysis and the uni-directional magnetic field.

13. The method of analyzing a substance for determining the presence therein of certain nuclei in a pre-selected chemical state having a predetermined relatively short relaxation time and being adapted and arranged to resonate in response to the application of magnetic fields adapted and arranged to produce a state of nuclear magnetic resonance for a time interval of predetermined relatively short duration, as compared with other nuclei in a non-selected state therein having a comparatively long relaxation time and being adapted and arranged to attain a significant state of equilibrium in response to the application of said magnetic fields for a significantly longer time interval of predetermined longer duration, comprising the steps of applying said fields to the substance for a time interval of at least said predetermined short duration and less than said predetermined longer duration, whereby substantially only certain nuclei in said pre-selected state are caused to resonate and detecting the state of resonance of said substance, whereby the presence of any of said nuclei in said pre-selected state may be determined.

14. The method of claim 13 wherein the magnetic fields are applied to the substance under analysis for a predetermined time interval of sufficient duration to produce a significant state of nuclear magnetic resonance in hydrogen nuclei of hydrocarbon molecules in said substance, and wherein the duration of said time interval is of insufficient duration to produce a significant state of nuclear magnetic resonance in hydrogen nuclei of water molecules in said substance.

15. The method of analyzing a substance for determining the presence therein of certain pre-selected nuclei having a predetermined relatively short relaxation time and being adapted and arranged to resonate in response to the application of given uni-directional and alternating magnetic fields proportioned and oriented with respect to one another to produce a state of nuclear magnetic resonance for a time interval of predetermined relatively short duration, as compared with other non-selected nuclei therein having a comparatively long relaxation time and being adapted and arranged to resonate in response to the application of said magnetic fields for a significantly longer time interval of predetermined longer duration, comprising the steps of applying said fields to the sample for a time interval of at least said predetermined short duration and less than said predetermined longer duration, whereby substantially only said pre-selected nuclei are caused to resonate, and detecting the state of resonance of said sample, and providing an indication thereof, whereby the presence of any of said pre-selected nuclei may be determined.

16. The method of claim 15 comprising controlling the time interval during which the magnetic fields are applied to said substance by modulating the unidirectional field.

17. The method of analyzing a substance to determine the presence of certain pre-selected nuclei having a relatively short relaxation time compared to that of certain other nuclei, whereby said preselected nuclei are adapted to attain a resonant condition in response to given magnetic fields suitably proportioned with respect to one another and applied thereto for a predetermined short duration of time as compared with a predetermined longer duration of time required to cause said other nuclei to attain a resonant condition in response to the same field, which comprises the steps of producing magnetic fields proportioned and oriented with respect to one another to cause said nuclei to attain a resonant condition, and exposing the substance to said magnetic fields for a predetermined interval of time of at least said predetermined short duration and less than said predetermined longer duration, thereby to cause substantially only the nuclei having a relatively short relaxation time to attain the resonant condition, and detecting the response of said nuclei to the magnetic fields so that the presence of nuclei having a relatively short relaxation time can be determined.

18. The method of claim 17 comprising controlling the time interval during which the magnetic fields are applied to said substance is controlled by causing relative motion between said substance and at least one of the magnetic fields.

19. The method of claim 17 wherein said pre-selected nuclei are hydrogen atoms contained in hydrocarbon molecules and wherein said other nuclei are hydrogen atoms contained in water molecules, and comprising exposing the substance to the magnetic fields for a predetermined interval of time which is of sufficient duration to cause the hydrogen nuclei of the hydrocarbon molecules to attain a significant resonance condition and of insufficient duration to cause the hydrogen nuclei of the water molecules to attain a resonance condition of comparable significance.

20. The method of claim 19 which further includes analyzing said substance to determine the presence of hydrogen atoms including those of both hydrocarbon and water molecules.

21. The method of claim 20 wherein said analyzing said substance to determine the presence of the hydrogen atoms including those of both hydrocarbon and water molecules comprises exposing the substance to said magnetic fields for a time interval of sufficient duration to cause hydrogen nuclei of both hydrocarbon and water molecules to attain a significant resonance condition, and detecting the response to said longer duration field.

22. Apparatus for analyzing a substance to determine the presence of certain pre-selected nuclei having a relatively short relaxation time compared to that of certain other nuclei, whereby said pre-selected nuclei are adapted to contain a resonant condition in response to given magnetic fields suitably proportioned with respect to one another and applied thereto for a predetermined short duration of time as compared with a predetermined longer duration of time required to cause said other nuclei to attain a resonant condition in response to the same field, which comprises means for producing magnetic fields proportioned and oriented with respect to one another to cause said nuclei to attain a resonant condition, control means including timing apparatus for applying said magnetic fields for a predetermined interval of time of at least said predetermined short duration and less than said predetermined longer duration, thereby to cause substantially only the nuclei having a relatively short relaxation time to attain the resonant condition, and means for detecting the response of said nuclei to the magnetic fields so that the presence of nuclei having a relatively short relaxation time can be determined.

23. In nuclear magnetism well logging involving passing a logging instrument through a bore hole for setting up a condition of nuclear magnetic precession at the nuclear magnetic resonance frequency in hydrogen nuclei contained in earth formations adjacent a bore hole and involving subjecting said formations to magnetic field conditions adapted to set up said condition of nuclear magnetic precession, including a polarizing unidirectional magnetic field and detecting a condition of nuclear magnetic precession of said hydrogen nuclei, the improvement comprising subjecting said formations including hydrogen nuclei therein to said polarizing unidirectional magnetic field for a first time interval having a duration intermediate the nuclear magnetic relaxation time constant of nuclei of hydrocarbons in said formations and the nuclear magnetic relaxation time constant of hydrogen nuclei of water in said formations, obtaining a first signal indication by detecting the condition of nuclear magnetic precession at said nuclear magnetic resonance frequency in response to said magnetic field conditions including said application of said unidirectional field for said first time interval, subjecting said formations to said polarizing unidirectional magnetic field for a second time interval at least as long as the longer nuclear magnetic relaxation time constant of said hydrogen nuclei in said hydrocarbon or water in said formations, obtaining a second signal indication by detecting the condition of nuclear magnetic precession at said nuclear magnetic resonance frequency in response to said magnetic field conditions including said application of said unidirectional field for said second time interval, and comparing said first and second signal indications to evaluate the hydrocarbon content of said formations.

24. In nuclear magnetism well logging involving passing a logging instrument through a bore hole for setting up a condition of nuclear magnetic precession at the nuclear magnetic resonance frequency in hydrogen nuclei contained in earth formations adjacent a bore hole and involving subjecting said formations to magnetic field conditions adapted to set up said condition of nuclear magnetic precession including a polarizing unidirectional magnetic field and detecting a condition of nuclear magnetic precession of said hydrogen nuclei, the improvement comprising subjecting said formations including hydrogen nuclei therein to said polarizing unidirectional magnetic field for a first time interval having a duration intermediate the nuclear magnetic relaxation time constant of hydrogen nuclei of hydrocarbons in said formations and the nuclear magnetic relaxation time constant of hydrogen nuclei of water in said formations, obtaining a first signal indication by detecting the condition of nuclear magnetic precession at said nuclear magnetic resonance frequency in response to said magnetic field conditions including said application of said unidirectional field for said first time interval, conducting another log of the well bore which involves deriving a second signal indication by detecting the total content of hydrogen nuclei in the formation, and comparing said first and second signal indications to evaluate the hydrocarbon content of said formations.

25. The method of well logging defined in claim 24 wherein said second signal indication is derived by subjecting said formation including hydrogen nuclei in both hydrocarbons and water in said formations to a condition of nuclear magnetic precession at the nuclear magnetic resonance frequency and detecting the resonance condition of said hydrogen nuclei at said magnetic resonance frequency.

26. In an apparatus for well logging, the combination which comprises a logging head adapted to be moved along a well bore, a magnet located in the head and having its major axis extending along the direction which the tool is to be moved for producing a uni-directional magnetic field in a region around the well bore, means for simultaneously producing an alternating magnetic field in said region offset toward one end from the central portion of the region, the alternating magnetic field being coincident with the unidirectional magnetic field and having a component of its vector transverse to that of the uni-directional magnetic field and being tuned to the resonance frequency for nuclei of predetermined atoms, and means for detecting the response of said nuclei to the magnetic fields as the logging head is moved along the well bore, said apparatus further including a second means for simultaneously producing a second alternating magnetic field in said region offset toward the other end from the central portion of the region, the second alternating magnetic field being coincident with the unidirectional magnetic field and having a component of its vector transverse to that of the uni-directional magnetic field and being tuned to the same resonance frequency as that of the first alternating magnetic field, and further means for detecting the response of the nuclei to the uni-directional magnetic field and the second alternating magnetic field as the logging head is moved along the well bore.

27. A well logging apparatus comprising an elongated instrument adapted to be moved through a well bore along its principal axis including means for producing a unidirectional magnetic field having flux lines which pass through a region located outside the instrument, means asymmetrically located along the principal axis of the instrument with respect to the unidirectional magnetic field for producing in said region an alternating magnetic field offset in a direction along the principal axis of said instrument toward one end of the central portion of said region, said alternating magnetic field having a component of its vector transverse to that of the unidirectional magnetic field, the means for producing an alternating magnetic field being tuned to the resonance frequency for nuclei of predetermined atoms, and means for detecting the response of said nuclei to the magnetic fields, whereby when said logging instrument is moved through a well bore along its principal axis in a direction toward said one end thereof said region outside the instrument will be exposed to the unidirectional magnetic field for a shorter time interval before the alternating magnetic field is produced in said region than when said instrument is moved in the opposite direction through the well bore along its principal axis.

28. In apparatus for well logging, the combination which comprises a logging head adapted to be moved along a well bore, a magnet located in the head and having its major axis extending along the direction which the tool is to be moved for producing a unidirectional magnetic field in a region around the well bore, means for simultaneously producing an alternating magnetic field in said region offset in a direction along the major axis of said instrument toward one end from the central portion of the region, the alternating magnetic field having a component of its vector transverse to that of the unidirectional magnetic field and being tuned to the resonance frequency for nuclei of predetermined atoms, and means for detecting the response of said nuclei to the magnetic fields as the logging head is moved along the well bore, whereby when said logging head is moved through a well bore along its major axis in a direction toward said one end thereof said region outside the instrument will be exposed to the unidirectional magnetic field for a shorter time interval before the alternating magnetic field is produced in said region than when said instrument is moved in the opposite direction through the well bore along its major axis.

29. In the method of analyzing a substance by nuclear magnetism analysis wherein said substance is subjected to magnetic field conditions suitable to cause certain nuclei in said substance to attain a condition of precession at the characteristic nuclear magnetic resonance frequency, said field conditions including a polarizing magnetic field condition and at least another magnetic field condition suitable to cause polarized nuclei to precess, and wherein a response is detected which is related to said condition of precession in said substance due to said magnetic field conditions, the improvement comprising selectively determining the presence of certain preselected nuclei having a relatively short relaxation time as compared with other nuclei having longer relaxation times which may also be present, such that said preselected nuclei are adapted to attain a significant condition of polarization in response to a given polarizing unidirectional magnetic field condition applied thereto for a predetermined short duration of time as compared with a predetermined longer duration of time required to cause said other nuclei to attain a corresponding condition of polarization in response to the same polarizing unidirectional magnetic field condition, by applying said polarizing unidirectional magnetic field condition to said substance for a time interval of at least said predetermined short duration and less than said predetermined longer duration, thereby to cause the magnetic polarization of substantially only the preselected nuclei having a relatively short relaxation time, whereby the detected response of said substance to said magnetic field conditions is selective to said preselected nuclei in said substance to the substantial exclusion of any of said other nuclei which may also be present in said substance.

30. The method of claim 29 wherein said unidirectional magnetic field condition is applied to said substance for a predetermined short duration of time which is intermediate the time required to cause nuclei of hydrogen in water and the time required for hydrogen nuclei in hydrocarbon oils to attain a corresponding condition of polarization in response to the same polarizing unidirectional magnetic field condition, whereby said method is adapted to distinguish between hydrogen nuclei present in water as compared with those present in hydrocarbon oil.

31. The method of claim 29 further characterized in that said substance is also subjected to magnetic field conditions suitable to cause said other nuclei having longer relaxation times to attain a condition of precession at the characteristic nuclear magnetic resonance frequency including the additional step of applying said polarizing unidirectional magnetic field condition to said substance for a time interval of at least said predetermined longer duration, thereby to cause the magnetic polarization of the other nuclei having a relatively long relaxation time and detecting the response of said substance to said magnetic field conditions including the application of said polarizing unidirectional magnetic field condition for said predetermined longer duration, and comparing the said detected responses of said substance in order to determine the presence of both said preselected nuclei having a relatively short relaxation time and said other nuclei having a relatively long relaxation time.

32. The method of claim 31 wherein said preselected nuclei are hydrogen nuclei contained in water or oil and wherein said other nuclei are hydrogen nuclei contained in the other of said water or oil and wherein said predetermined short duration of time is of duration required to cause hydrogen nuclei in one of said water or oil to attain a condition of polarization in response to the specified polarizing unidirectional magnetic field condition for said predetermined short duration of time and wherein said predetermined longer duration of time is sufficient to cause hydrogen nuclei in both water and oil to attain a corresponding condition of polarization in response to the same polarizing unidirectional magnetic field condition, whereby said method is suitable to determine the presence of both water and oil in said substance.

33. In nuclear magnetism analysis well logging of fluids in situ in an earth formation surrounding a well bore involving subjecting the fluids to be distinguished to magnetic field conditions suitable to cause protons in said fluids to attain a condition of nuclear magnetic precession at the magnetic resonance frequency, the improvement for distinguishing between hydrocarbons and water in said fluids comprising the steps of establishing a first condition of nuclear magnetic precession of protons in the fluids to be distinguished by subjecting said fluids to said magnetic field conditions including a given polarizing unidirectional magnetic field condition for a predetermined short duration of time sufficient to produce a condition of nuclear magnetic precession at the magnetic resonance frequency of protons in one of said hydrocarbons and water, said predetermined short duration of time being less than a predetermined longer duration of time required to produce a corresponding condition of nuclear magnetic precession at the magnetic resonance frequency of protons contained in the other of said hydrocarbons or water, detecting a response of said fluids to said magnetic field conditions including said polarizing magnetic field applied for said predetermined short duration of time, establishing at least another condition of nuclear magnetic precession of protons in the fluids to be distinguished by subjecting said fluids to said magnetic field conditions including a given polarizing unidirectional magnetic field condition for a predetermined longer duration of time of sufficient duration to establish said corresponding condition of nuclear magnetic precession at the magnetic resonance frequency of protons contained in the other of said hydrocarbons or water, detecting a response of said fluids to the application of said magnetic field conditions including said polarizing unidirectional magnetic field applied for said longer duration of time, and comparing said detected responses.

34. In the method of analyzing a substance by magnetic precession analysis involving subjecting said substance to magnetic field conditions suitable to cause certain preselected submolecular atom portions possessing gyromagnetic properties in said substance to attain a given condition of magnetic precession at the characteristic magnetic resonance frequency of said atom portions, the improvement comprising determining the presence of certain preselected submolecular atom portions possessing gyromagnetic properties and having a relatively short relaxation time as compared to that of certain other submolecular atom portions possessing gyromagnetic properties and which may also be present, whereby said preselected submolecular atom portions are adapted to attain a given condition of magnetic precession at the characteristic magnetic resonance frequency of said atom portions in response to said magnetic field conditions including a given polarizing unidirectional magnetic field condition to which said substance is subjected for a predetermined short duration of time as compared with a predetermined longer duration of time required to cause said other submolecular atom portions to attain a corresponding given condition of magnetic precession in response to the same field conditions, which comprises the step of subjecting said subtance to said magnetic field conditions including subjecting said substance to said polarizing unidirectional magnetic field conditions for a time interval of at least said predetermined short duration to cause the preselected submolecular atom portions having a relatively short relaxation time to attain the given condition of magnetic precession, and detecting a response of said substance to said magnetic field conditions when said polarizing magnetic field condition has been applied to the substance for a time interval of at least said predetermined short duration and less than said predetermined longer duration, whereby the detected response is due primarily to the presence of said preselected submolecular atom portions in said substance to the substantial exclusion of any of said other submolecular atom portions which may also be present in said substance.

35. In the method of analyzing a substance by magnetic precession analysis involving subjecting said substance to magnetic field conditions suitable to cause certain preselected submolecular atom portions possessing gyromagnetic properties in said substance to attain a given condition of magnetic precession at the characteristic magnetic resonance frequency of said atom portions, the improvement comprising determining the presence of certain preselected submolecular atom portions possessing gyromagnetic properties and having a substantially different relaxation time as compared to that of certain other submolecular atom portions possessing gyromagnetic properties and which may also be present, such that said preselected submolecular atom portions are adapted to attain a given condition of magnetic precession at the characteristic magnetic resonance frequency of said atom portions in response to said magnetic field conditions including a given polarizing unidirectional magnetic field condition to which said substance is subjected for a predetermined short duration of time as compared with a predetermined longer duration of time required to cause said other submolecular atom portions to attain a corresponding given condition of magnetic precession in response to the same field conditions, which comprises the steps of subjecting said substance to said magnetic field conditions including subjecting said substance to said polarizing unidirectional magnetic field condition for a time interval of at least said predetermined short duration and less than said predetermined longer duration, thereby to cause substantially only the preselected submolecular atom portions having a relatively short relaxation time to attain the given condition of magnetic precession, and detecting a response of said substance to said magnetic field conditions as an indication of the presence of said preselected submolecular atom portions in said substance.

References Cited by the Examiner

UNITED STATES PATENTS

| | | | |
|---|---|---|---|
| 2,139,460 | 12/1938 | Potapenko | 324—.5 |
| 2,259,904 | 10/1941 | McNamee et al. | |
| 2,480,674 | 8/1949 | Russell | 255—1.8 |
| 2,535,666 | 12/1950 | Broding. | |
| 2,570,111 | 10/1951 | Goble | 324—1 |
| 2,721,970 | 10/1955 | Levinthal | 324—.5 |

OTHER REFERENCES

Torrey: Physical Review, vol. 76, No. 8, pp. 1059 to 1066.

Bloch: Physical Review, vol. 70, nos. 7 and 8, Oct. 1, 1946, pages 474 to 485.

CHESTER L. JUSTUS, *Primary Examiner.*

LEO QUACKENBUSH, SAMUEL BERNSTEIN, NORMAN H. EVANS, LEWIS H. MYERS, MAYNARD R. WILBUR, *Examiners.*

J. H. LINSCOTT, J. E. ROSENBLUM,
*Assistant Examiners.*